United States Patent
Sielen

(10) Patent No.: US 10,795,243 B1
(45) Date of Patent: Oct. 6, 2020

(54) ADJUSTABLE CAMERA CAGE

(71) Applicant: Fathom Camera, LLC, Brooklyn, NY (US)

(72) Inventor: Samuel Jude Sielen, Brooklyn, NY (US)

(73) Assignee: FATHOM CAMERA, LLC, Brooklyn, NY (US)

( * ) Notice: Subject to any disclaimer, the term of this patent is extended or adjusted under 35 U.S.C. 154(b) by 0 days.

(21) Appl. No.: 16/410,616

(22) Filed: May 13, 2019

(51) Int. Cl.
*G03B 17/56* (2006.01)

(52) U.S. Cl.
CPC .................. *G03B 17/561* (2013.01)

(58) Field of Classification Search
USPC ......................................... 396/428
See application file for complete search history.

(56) References Cited

U.S. PATENT DOCUMENTS

| | | | | |
|---|---|---|---|---|
| 4,272,177 A * | 6/1981 | Ottenheimer | .......... | F16M 11/08 396/423 |
| 4,514,067 A * | 4/1985 | Gallegos | ................ | F16M 13/04 224/908 |
| 4,768,049 A * | 8/1988 | Barrett | ................. | F16M 11/045 396/324 |
| 5,908,181 A * | 6/1999 | Valles-Navarro | .... | F16M 11/045 248/177.1 |
| 6,000,859 A * | 12/1999 | Mulcahy | ................ | G03B 15/05 396/422 |
| D570,396 S * | 6/2008 | Foddis | ......................... | D16/242 |
| 2012/0285909 A1* | 11/2012 | Parker | .................. | F16M 11/041 211/49.1 |

OTHER PUBLICATIONS

SmallRig VersaFrame Cage 1750, https://www.smallrig.com/smallrig-versaframe-cage-1750.html, dated Mar. 27, 2018. (Year: 2018).*
https://web.archive.org/web/20170724085949/https://store.zacuto.com/gh5-cage/ [cached Jul. 24, 2017].
https://www.amazon.com/Wooden-Camera-Panasonic-Unified-Accessory/dp/B076XR3GYF [retrieved Jun. 7, 2019].
https://www.amazon.com/Camera-Cage-Panasonic-Wooden-Handle/dp/B074CFSJDT [retrieved Jun. 7, 2019].
https://www.bhphotovideo.com/c/product/1235824-REG/tilta_es_t07_2_dslr_blackmagic_cinema.html [retrieved Jun. 7, 2019].
https://www.bhphotovideo.com/c/product/734317-REG/Shape_wlb_PA1200PRO_PAPARAZZI_II_PRO.html [retrieved Jun. 7, 2019].

(Continued)

*Primary Examiner* — Rodney E Fuller
(74) *Attorney, Agent, or Firm* — Leonid Kisselev

(57) ABSTRACT

An adjustable camera cage is provided. The camera cage includes multiple adjustable points of attachment for a camera, allowing cameras of different configurations to be secured within the cage. The cage includes an offset between two sides of the cage, allowing for increased access to the camera. The cage includes a plurality of attachment points suitable for attachment of external accessories of various makes and designs. Due to the adjustability of the cage, use of the cage is possible with a wide variety of cameras, including mirrorless and DSLR cameras, providing security of attachment and compatibility with a multitude of non-proprietary and industry-standard accessory interfaces.

18 Claims, 14 Drawing Sheets

(56) References Cited

OTHER PUBLICATIONS https://www.bhphotovideo.com/c/product/1302046-REG/kamerar_kamgb3_gearbox_gb_3_video_cage.html [retrieved Jun. 7, 2019].
https://www.bhphotovideo.com/c/product/1368306-REG/manfrotto_mvccl_camera_cage_large.html [retrieved Jun. 7, 2019].
https://www.bhphotovideo.com/c/product/1252841-REG/promediagear_vrc1_adjustable_video_cage_for.html/?smp=Y&ap=y&lsft=Bl%3A514&,gclid=CjwKEAjwlujnBRDI2teOp_veulQSJAC5bHgt0wFyW6n7E0xFUL0Ub_QGull5NHzrnlCkXrHKihQ30BoCCAnw_wcB [retrieved Jun. 7, 2019].
https://www.bhphotovideo.com/c/product/1276941-REG/varavon_am_zeus_uni_zeus_uni_c_type_cage.html [retrieved Jun. 7, 2019].
https://www.bhphotovideo.com/c/product/1302038-REG/kamerar_kgh4_gh_4_fhugen_video_cage.html [retrieved Jun. 7, 2019].
https://www.smallrig.com/smallrig-fujifilm-x-h1-camera-cage-2123.html [retrieved Jun. 7, 2019].

\* cited by examiner

10

7

10

10

ADJUSTABLE CAMERA CAGE

FIELD

The present invention relates in general to image capturing, and in particular, to an adjustable camera cage.

BACKGROUND

While image capturing, such as videography and photography, is an art, the quality and characteristics of a captured image are heavily dependent on the capabilities of the equipment used for the photography. When the inherent capabilities of the camera are not sufficient for a particular project, these capabilities can be supplemented with external accessories. Accessories for film cameras were generally limited to those affecting the quality of the image, such as lenses and flashes. As cameras became digital and capable of both still-photography and videography, the number of dimensions where a camera's capabilities could be supplemented grew, and so did the number of possible accessories, now including devices as diverse as camera lights, shotgun microphones, audio recorders, monitors, handles, and wireless audio receivers.

As the number of possible accessories for a camera increased, so did the challenge of properly positioning them on the camera, especially for smaller cameras. Such challenge is particularly apparent in the case of mirrorless cameras and digital single-lens reflex ("DSLR") cameras used for video production. These video-capable mirrorless and DSLR cameras are often chosen over traditional camcorders due to their larger sensors that produce clean and cinematic images even in less than ideal lighting and are capable of shooting in high resolution such as HD and 4 k. However, these types of cameras do not provide many, if any, attachment points for external accessories.

Several strategies have been tried to attach accessories to mirrorless 4K cameras and DSLR cameras. One approach is to attach the accessory to a flash shoe of the camera. However, such attachment is not secure, and a use of such an attachment is associated with the risk of an expensive accessory falling from the flash shoe and getting damaged. Another approach is to use a camera cage. Such cages generally fall into groups. One group is a form fitting design that fits one camera model only, and while being well-adapted for that particular model, will not fit another camera that has even a slightly different shape. The second group covers cages that aim for a "universal" design that can adapt to various camera models. Such "universal" designs have often have a low level of security of attachment of the cage to the camera, once again increasing the risk of a damage to an accessory in case the accessory disengages from the cage as well as creating the inconvenience of the camera moving within the cage. Further, despite these "universal" designs are often best-fitted to work with particular proprietary accessories, working poorly with third party accessories, and thus limiting the capabilities of the videographer. Further, both kinds of designs tend to be bulky and cumbersome, making them difficult to use and making reaching certain portions of the camera a challenge during use, especially with a significant number of external accessories attached. As a result of these limitations, once a person obtains a new type of camera, that person generally needs a new camera cage for attachment of camera accessories. Further expenses are incurred if the camera cage suitable for a new camera accepts only proprietary equipment and the user's present accessories do not match the brand of equipment that the camera cage accepts.

Accordingly, there is a need for a way to securely attach external accessories to a camera that is applicable across various camera designs and which allows use of various types and makes of external camera accessories.

SUMMARY

An adjustable camera cage is provided. The camera cage includes multiple adjustable points of attachment for a camera, allowing cameras of different configurations to be secured within the cage. The cage includes an offset between two sides of the cage, allowing for increased access to the camera. The cage includes a plurality of attachment points suitable for attachment of external accessories of various makes and designs. Due to the adjustability of the cage, use of the cage is possible with a wide variety of cameras, including mirrorless 4K cameras and DSLR cameras, providing security of attachment and compatibility with a multitude of non-proprietary and industry-standard accessory interfaces.

In one embodiment, a camera cage is provided. The cage includes a baseplate including a base on which one or more contact points for a camera can be formed, the baseplate further including a first protrusion formed on one side of the base and a second protrusion formed on an another side of the base. The cage further includes a first side plate attached to the first baseplate protrusion; a top plate including a first end fixedly attached to the first side plate and a second end attached to a connector, the top plate further including one or more mounts for one or more external camera accessories; the connector including a connecting portion and a second side plate, the connecting portion connecting the top plate second end to a first end of the second side plate, a second end of the second side plate attached to the second baseplate protrusion, the second side plate being substantially parallel to the first side plate and not directly opposite the first side plate; and a further mount for the camera attached to the top plate.

In a further embodiment, an adjustable camera cage is provided. The cage includes a baseplate including a base on which one or more contact points for a camera can be formed, the baseplate further including a first protrusion formed on one side of the base and a second protrusion formed on an another side of the base. The cage further includes a first side plate attached to the first baseplate protrusion; a top plate comprising a first end fixedly attached to the first side plate and a second end attached to a connector, the top plate further including one or more mounts for one or more external camera accessories; the connector including a connecting portion and a second side plate, the connecting portion connecting the top plate second end to a first end of the second side plate, a second end of the second side plate attached to the second baseplate protrusion, the second side plate being substantially parallel to the first side plate and not directly opposite the first side plate; and a shoe-mount-lock to which the camera can be attached, the shoe-mount-lock secured to the top plate, wherein a position of at least a portion of the shoe-mount-lock relative to the top plate can be changed in at least three axis.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Providing a plurality of adjustable mounting points on a camera cage can make the cage compatible with a wide variety of cameras. While the cage described below can be used with mirrorless 4K cameras and DSLR cameras, the cage can also be compatible with other types of photo and video cameras.

Figure 1:
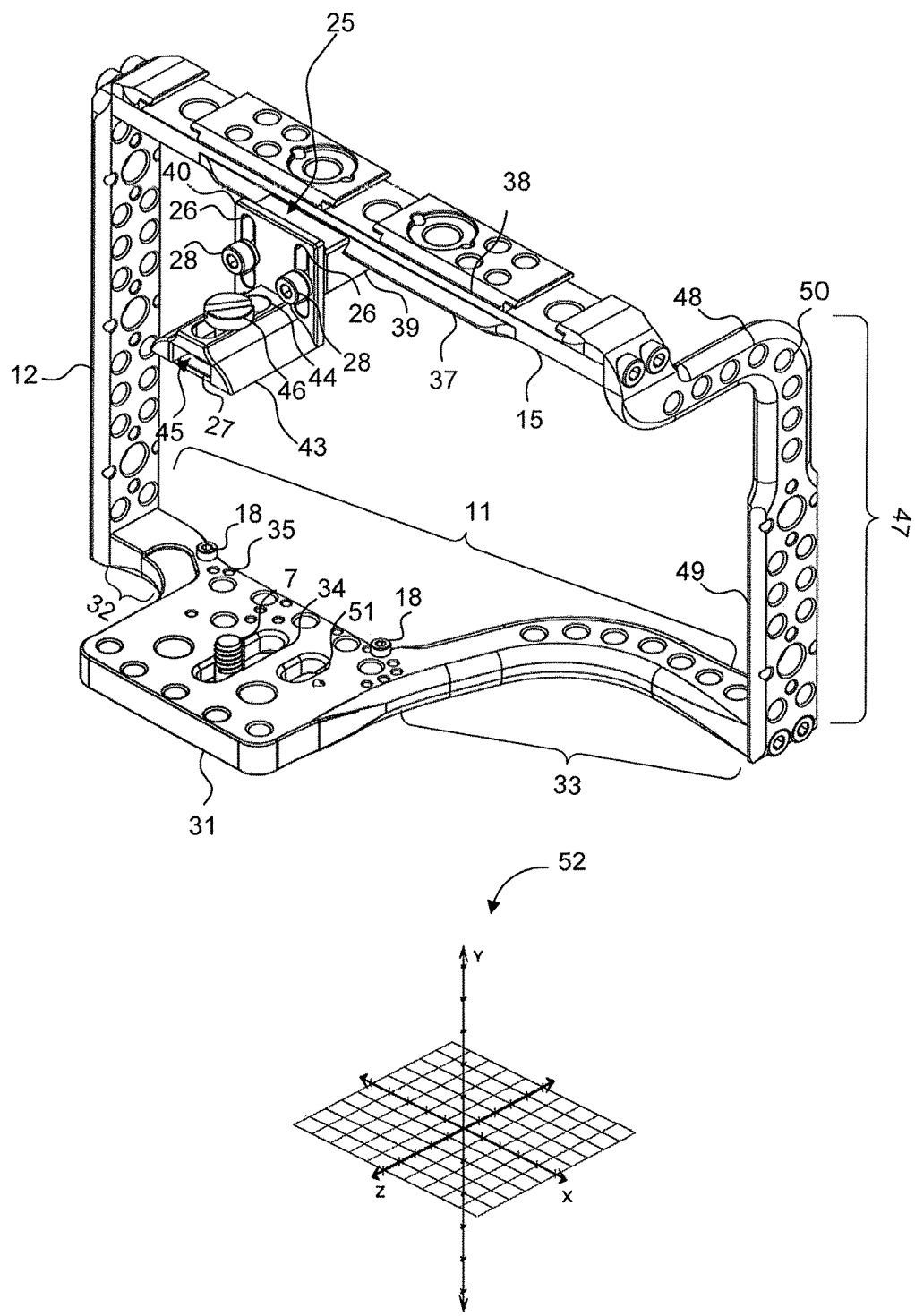
FIG. 1 is a perspective view of an adjustable camera cage in accordance with one embodiment.

FIG. 1 is a perspective view of an adjustable camera cage 10 in accordance with one embodiment. The cage 10 is formed by several components. One component is a baseplate 11 that includes a base 31, a first protrusion 32 formed on one side of the base, and a second protrusion 33 formed on another side of the base 31. The second protrusion 33 is curved and extends into a different direction from the base 11 than the first protrusion 32; thus, the ends of the first protrusion 32 and the second protrusion 33 that are most distant from the base 31 are offset from each other with respect to the z-axis (shown in a three-dimensional grid 52 shown for purposes of clarity).

Figure 4:
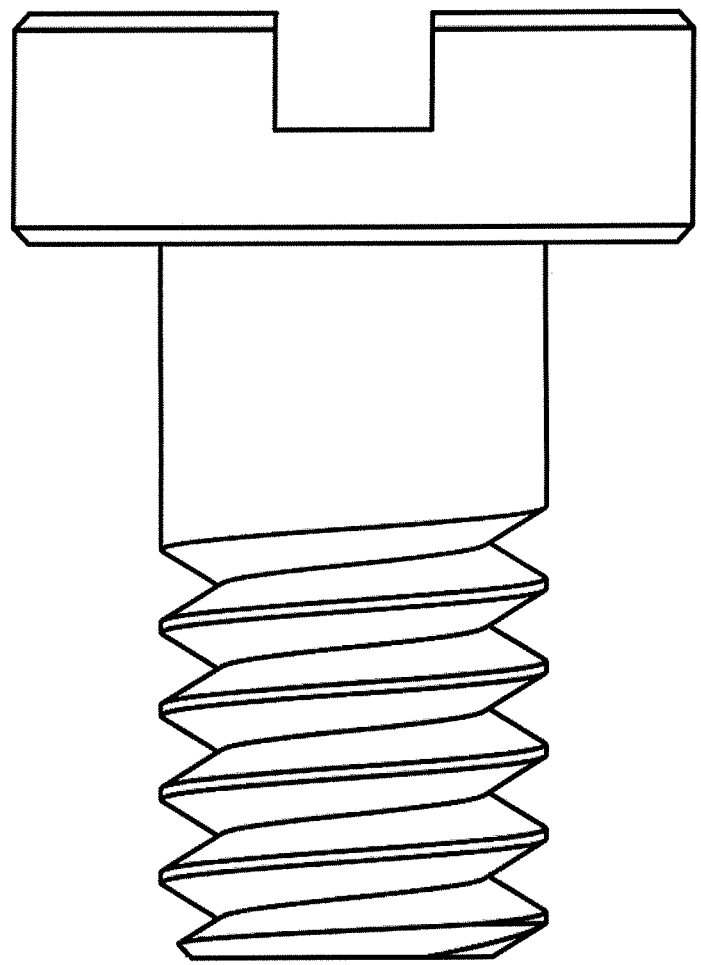
FIG. 4 is an expanded view of the screw in accordance with one embodiment.

As used below, the term "contact point" can refer to a part of the cage 10 that plays a part in immobilization of the camera within the cage 10, such as a component against which the camera butts, or a component on which the camera mounts. The base 31 includes a plurality of positions where contact point for a camera can be formed. In particular, the base 31 includes an elongated aperture 34 into which a non-undercut screw 7, with a camera mounting onto the screw 7 when the screw is inserted into the aperture 34. FIG. 4 is an expanded view of the screw 7 in accordance with one embodiment. As can be seen with reference to FIG. 4, the non-undercut screw is a non-threaded shaft above threads maintains major diameter opposed to being reduced to minor diameter. Returning to FIG. 1, the position of the screw 7 within the elongated aperture 34 can be adjusted, depending on a configuration of a camera to be mounted. The elongated aperture 34 is long enough to accommodate different positions of a tripod hole on a camera. In one embodiment, the width of the elongated aperture 34 can be ¼ of an inch, though other widths are also possible. The use of a non-captive, non-undercut screw 7 drastically reduces lateral play at this mounting point, providing a more secure connection to a camera.

Figure 5:
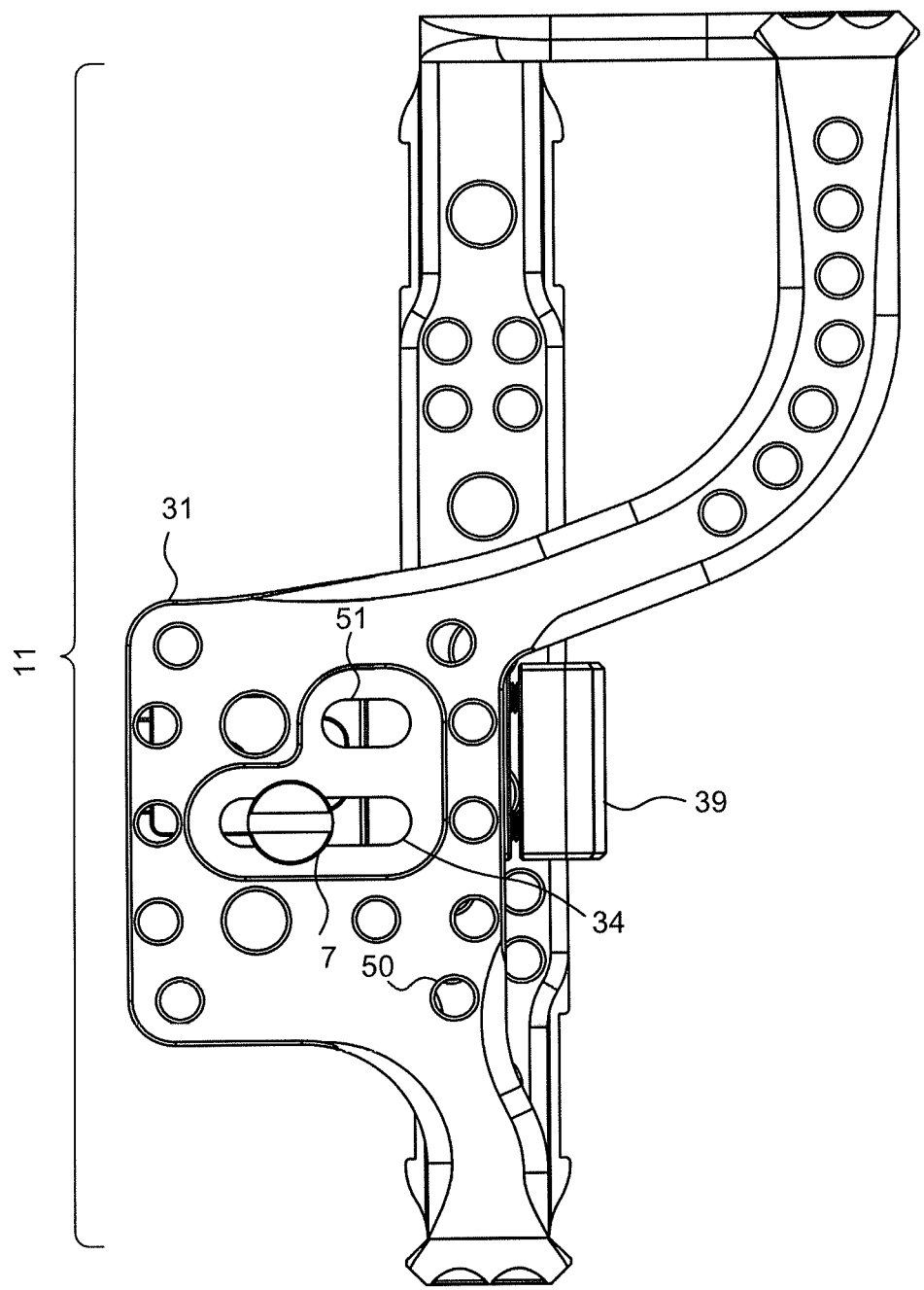
FIG. 5 is a bottom view of the cage of FIG. 1.
Figure 6:
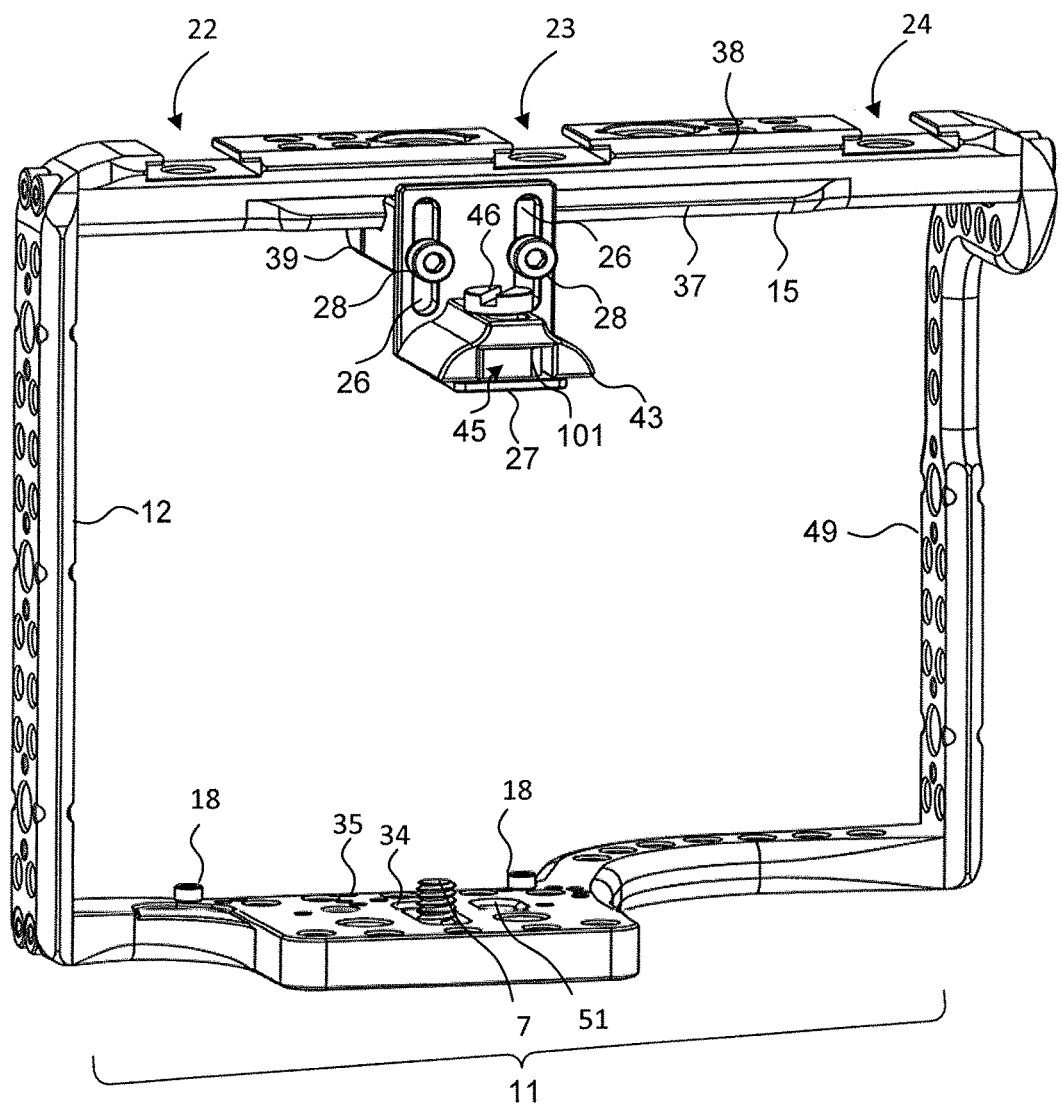
FIG. 6 is a further perspective view of the cage of FIG. 1.

In one embodiment, the elongated aperture 34 is the only aperture in which the screw 7 can be inserted. In a further embodiment, an additional aperture 51 is present in the base 31 in which the screw 7 can be inserted, as can be seen, among others, with reference to FIGS. 1, 5, and 6. FIG. 5 is a bottom view of the cage 10 of FIG. 1. FIG. 6 is a further perspective view of the cage 10 of FIG. 1. The aperture 51 is located to the side of the aperture 34, providing additional flexibility for camera engagement. In particular, inserting the screw 7 into the aperture 51 allows for compatibility with especially small cameras where the ¼ inch hole on the bottom is closer than usual to the battery compartment, allowing to access the battery without removing the camera from the cage.

The base 31 further includes a plurality of circular apertures 35 where two repositionable screws 18 can be secured. The screws 18 can be screwed in into any of the circular apertures 35, allowing to adjust their positions to a specific camera configuration. The camera mounts up against the screws 35 when they are in the position, and due to there being two screws 35, the camera is prevented from twisting when mounted up against the screws 35.

While three contact points using which a camera can be secured to the cage 10 are located on the baseplate 11, an additional contact point, a mount, is located at another portion of the cage 10. Attached to the first protrusion 32 of the baseplate is a first side plate 12, which in turn is attached to a top plate 15. The top plate 15 includes a plurality of mounts 36 for external camera accessories. The mounts 22, 23, 24 can be industry-standard cold shoe mounts, into which the accessories insert and which mechanically secures the accessories. The accessories can include lights, monitors, tripod plates, wireless audio receivers, external microphones, audio recorders, and handles, though other kinds of accessories are also possible. In a further embodiment, the mounts 22, 23, 24 can be industry-standard hot shoe mounts and electrically connect the accessories to the camera engaged to the cage 10 (such as via a shoe-mount-lock 25 described below). While three mounts 22, 23, 24 are shown with reference to FIG. 1, in a further embodiment, a different number of external accessory mounts 22, 23, 24 on the top plate 15 are possible.

Figure 2:
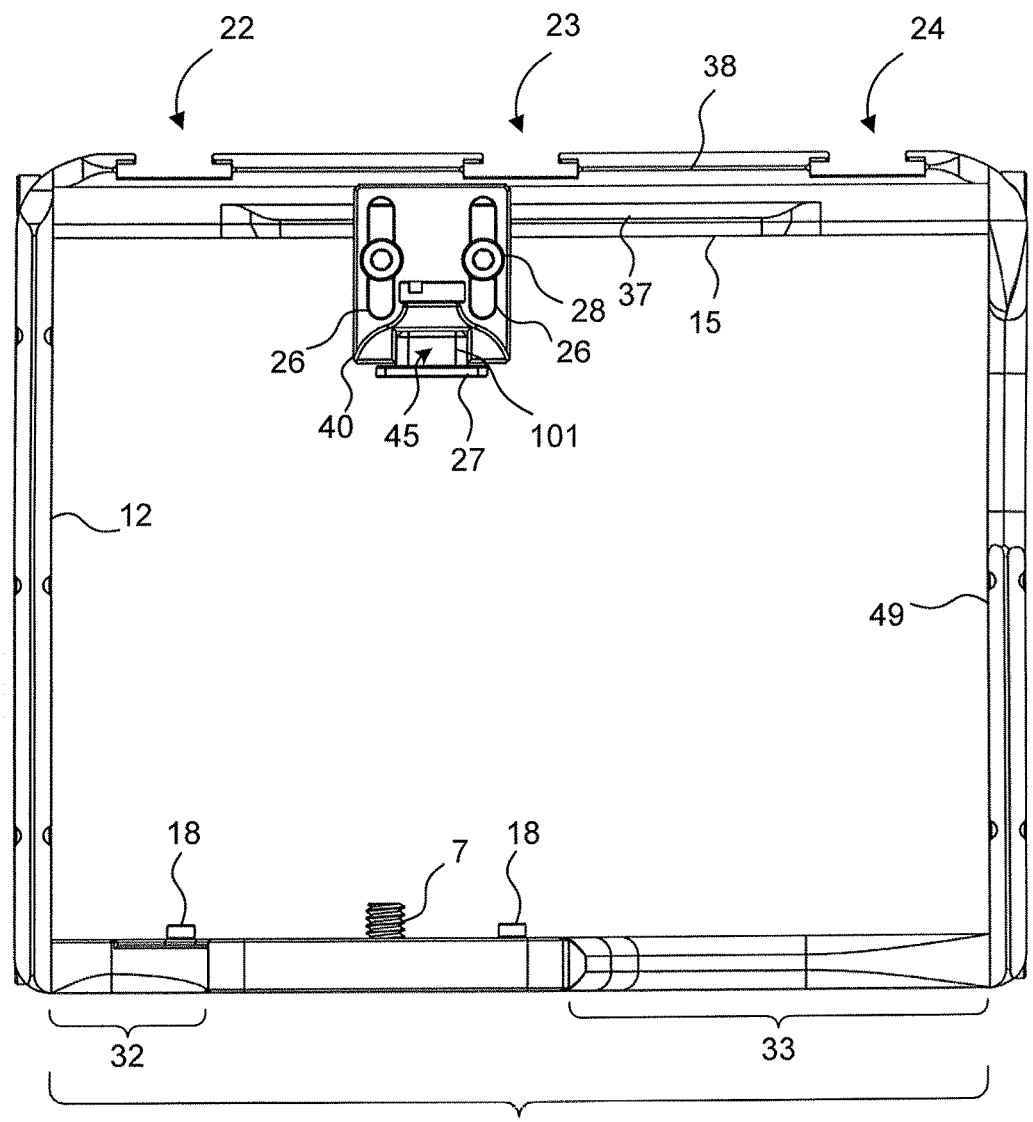
FIG. 2 is a back view of the cage of FIG. 1.
Figure 3:
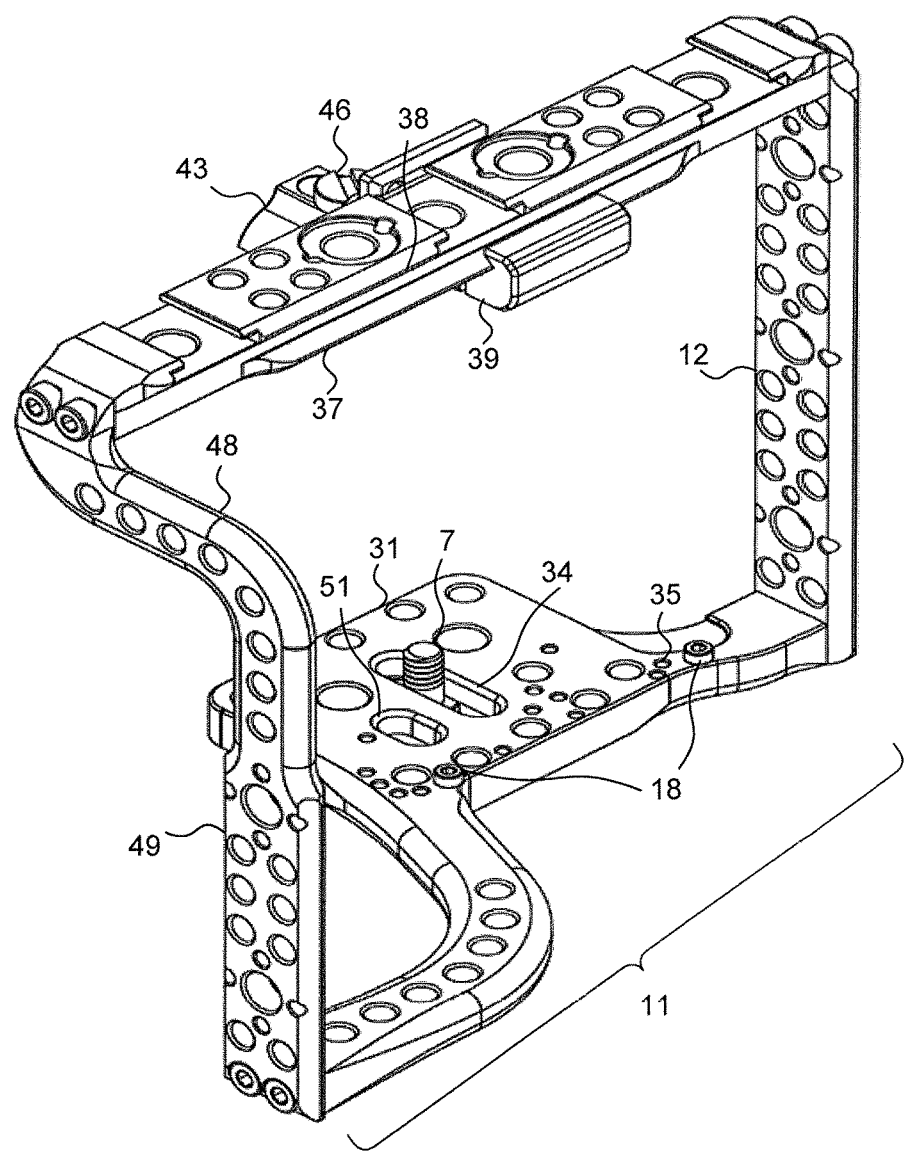
FIG. 3 is a further perspective view of the cage of FIG. 1.

Two accessory rails 37, 38 run in tandem on the sides of the top plate 15, as can be seen with reference to FIGS. 2 and 3. FIG. 2 is a back view of the cage 10 of FIG. 1. FIG. 3 is a further perspective view of the cage 10 of FIG. 1. The accessory rails 37, 38 can be NATO rails, though other kinds of accessory rails 37, 38 are also possible. Each of the rails 37, 38 run on opposite sides of the top plate 15, with the rail 37 being below the rail 38 (with respect to the orientation shown with reference to FIGS. 2 and 3). The mounts 22, 23, 24, are cut into the rail 38. Despite the presence of the mounts 22, 23, 24, the rail 38 remains continuous in the sense that an object, such as the slide 39 (discussed below) can slide along the entire length of the rail 38 without interruptions. Removably attached to one of the two accessory rails is a shoe-mount-lock 25 that serves as a further mount for the camera. In particular, a flash shoe of the camera can attach to the shoe-mount-lock 25. As further described below, the position of the shoe-mount-lock 25 can be adjusted in three planes, allowing to adjust the position of the shoe-mount-lock 25 necessary to couple with the flash shoe of the camera.

The shoe-mount-lock 25 includes a slide 39, portions of which are slide onto one of the accessory rails 37, 38. The portions of the slide 39 within the rails 37, 38 secure the slide 39 within the rails 37, 38 and also allow the slide 39 to move along the length of the rails 37, 38 (along the x-axes shown with reference to FIG. 1). As further discussed below, the slide 39 can be removably attached to the rails 37, 38, with the removal from one of the rails 37, 38 allowing repositioning of the slide 39 onto another one of the rails 37, 38 and pairing the cage 10 with a camera whose configuration would otherwise prevent use with the cage 10. Thus, while with reference to FIGS. 1-3, 6, 7, 8, 9, 10, the slide 39 is shown being on the rail 37, the slide 39 is shown on the rail 38 with reference to FIGS. 11 and 12.

Returning to FIG. 1, the shoe-mount-lock 25 further includes a plate 40 that is attached to one side of the slide 39. The degree of tightness with which the plate 40 is attached to the slide 39 is controlled via a tightening of bolts 28 that are screwed into the slide 39, passing through elongated slots 26 formed within the plate 40. The tightening (deeper insertion into the slide 39) of the bolts 28 causes a tighter attachment of the plate 40, resulting in the immobilization of the plate 40 against the slide 39. A loosening (shallower insertion into the slide 39) of the bolts 28 allows the plate to move along the length of the elongated slots 41.

Attached to the plate 40 is a shoe mount top 43, a pyramidal structure that includes an elongated slot 44 along the top surface. The shoe mount top includes an indentation 45 and together the indentation 45 and the elongated slot 44 of the top surface form a void within the pyramidal structure. A bolt 46 inserted through the elongated slot 44 of the shoe mount top 43 and connects to a shoe mount foot 27, which is a flat support structure located below (relative to the orientation shown with reference to FIG. 1) the indentation 45 and the slot 44. In one embodiment, the foot 27 is square, though other shapes of the foot 27 are also possible. The foot 27 is connected to a shoe mount ankle 101 (visible with reference to FIGS. 2, 6, 9, and 11) and into which the bolt 46 inserts, with the ankle 101 thus connecting the shoe 27 to the bolt 46.

The bolt 46 can move along the length of the elongated slot 44, As can be seen with reference to FIG. 2, the foot 27 is wider than the indentation 45 in the shoe mount top 43 and thus cannot enter the indentation 45 (with movement away from the shoe mount being limited by the length of the bolt 46 to which the foot 27 is attached). At the same time, the foot 47 is shorter than the shoe mount top 43 and thus the movement of the bolt 46 along the length of the slot 44 shifts the position of the foot 27 relative to the shoe mount top 43. As the shoe mount foot 27 and the shoe mount top 43 (while being connected by the bolt 46 inserted into the ankle 101 of the shoe 27) together form a camera shoe attachment point into which the camera shoe inserts, the adjustable position of the shoe mount foot 27 allows to accommodate different camera shapes and different placements of the camera flash shoes.

Figure 9:
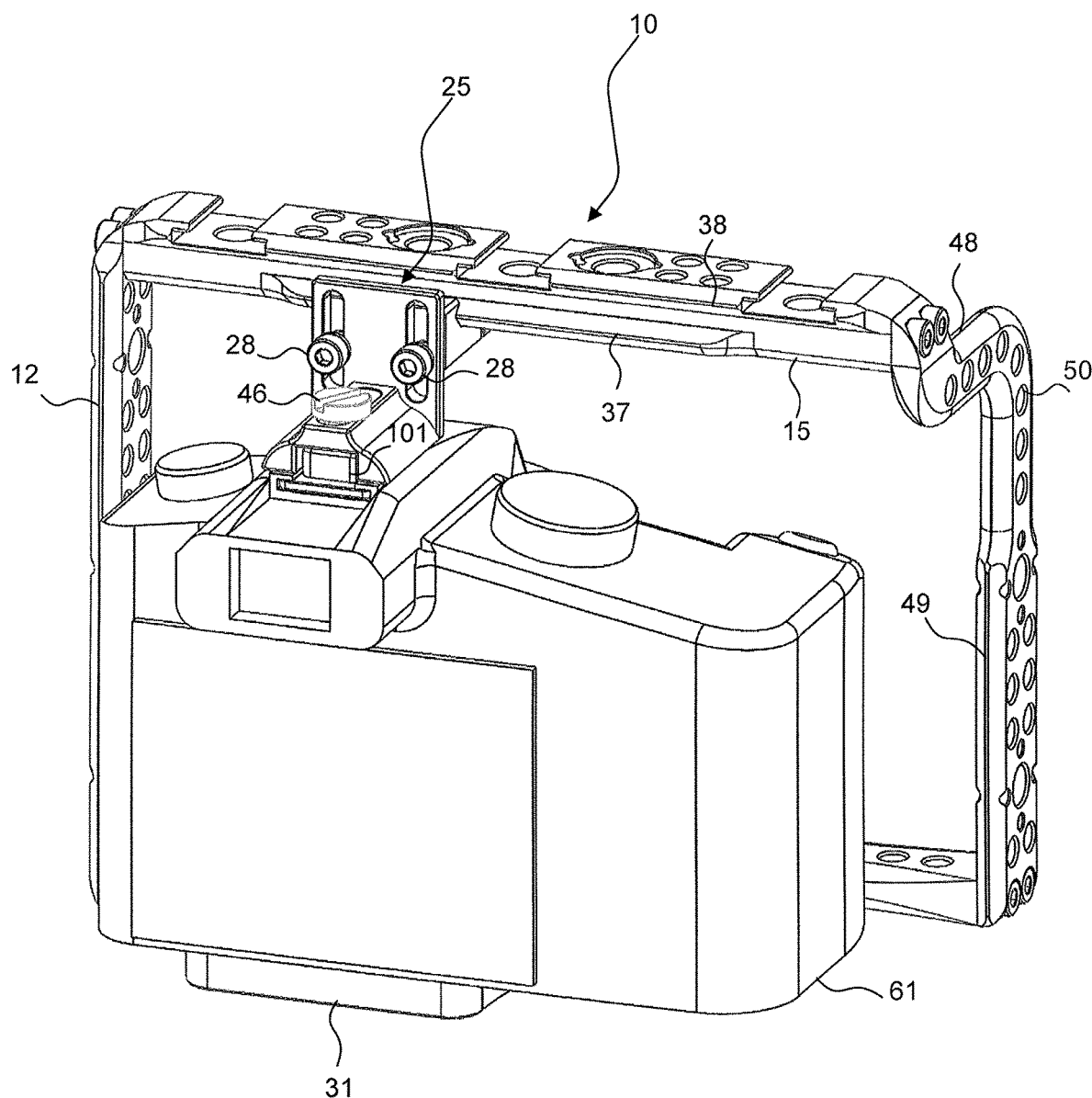
FIGS. 9 and 10 are diagrams showing the cage when coupled to a camera in accordance with one embodiment.
Figure 10:
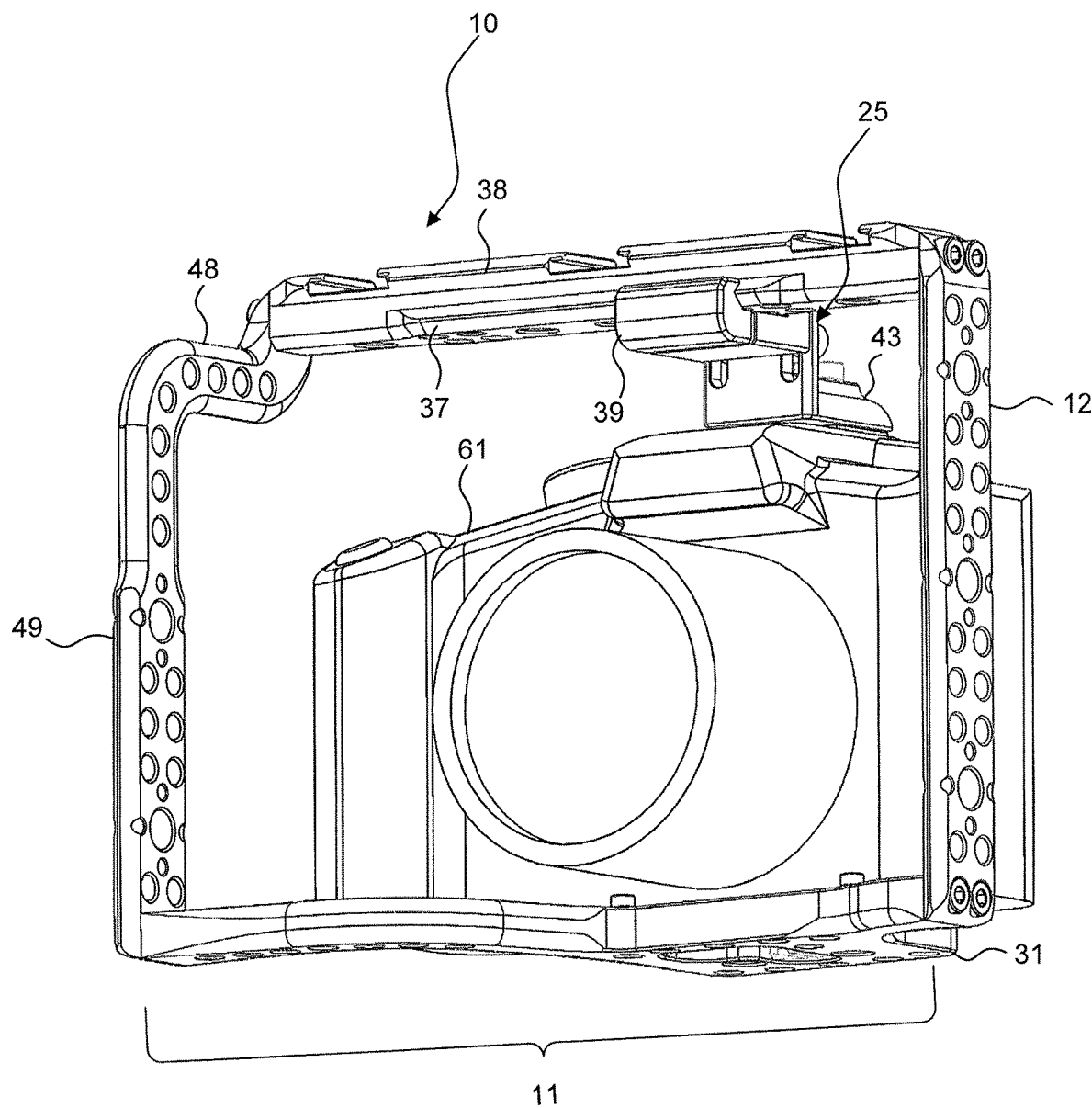

As described above, the shoe-mount-lock 25 can be simultaneously adjusted in three planes. Movement along the accessory rails 37, 38 allows to adjust the position of the x-axes (with respect to the orientation shown with reference to FIG. 1). Movement along the elongated slots 26 of the plate 40 allows to adjust the position of the shoe along the y-axes (with respect to the orientation shown with reference to FIG. 1). Finally, movement of the shoe-mount foot 27 relative to the shoe mount top 43 allows to adjust the shoe-mount-lock in the z-direction. Thus, the adjustable construction and positioning of the shoe-mount-lock 25 allows to match a configuration of flash shoes of a wide variety of cameras. FIGS. 9 and 10 are diagrams showing the cage 10 when coupled to a camera 61 in accordance with one embodiment.

Figure 11:
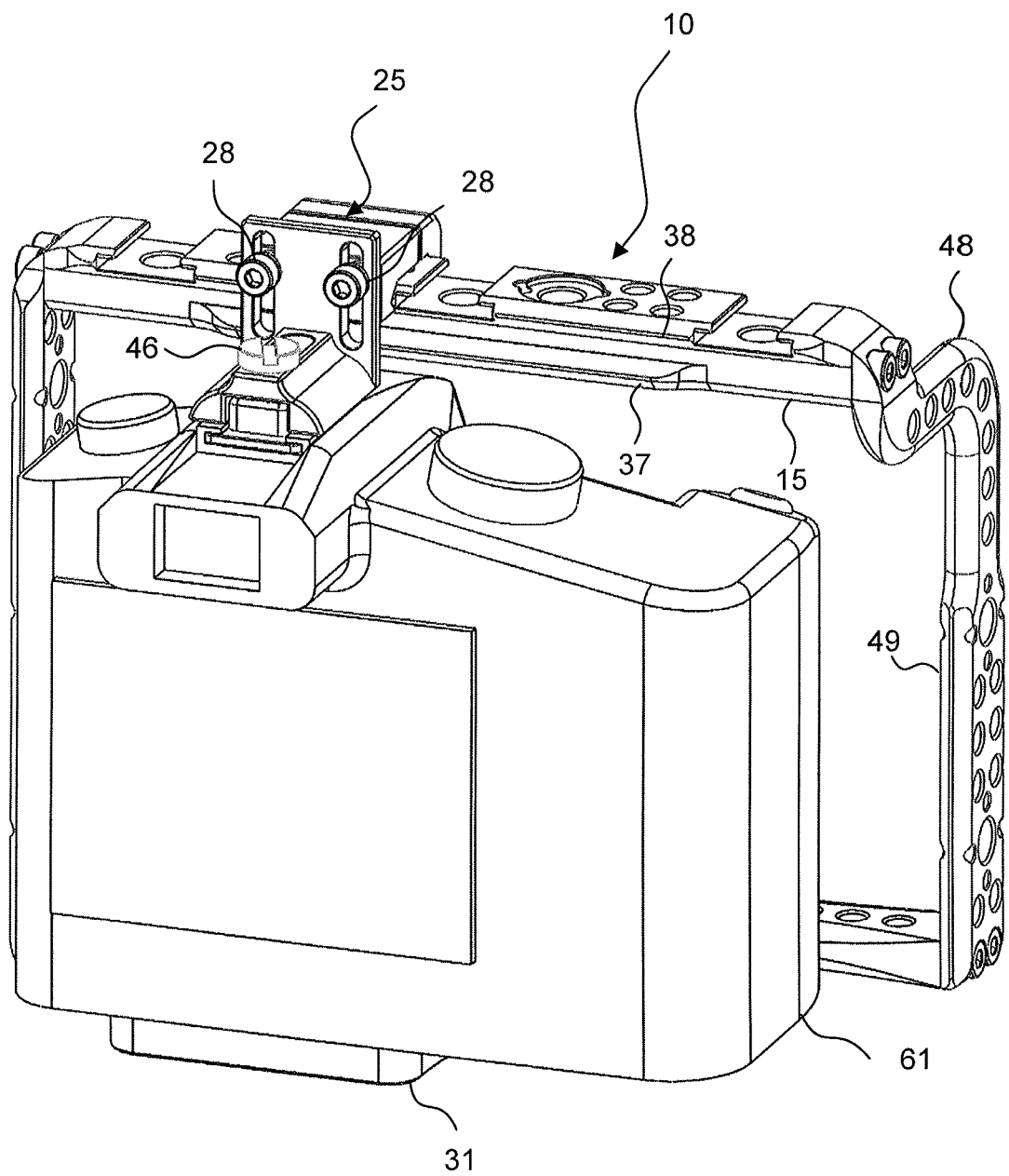
FIGS. 11 and 12 are diagrams showing the cage attached to a camera, with the shoe-mount-lock of FIG. 1 being in an elevated position.
Figure 12:
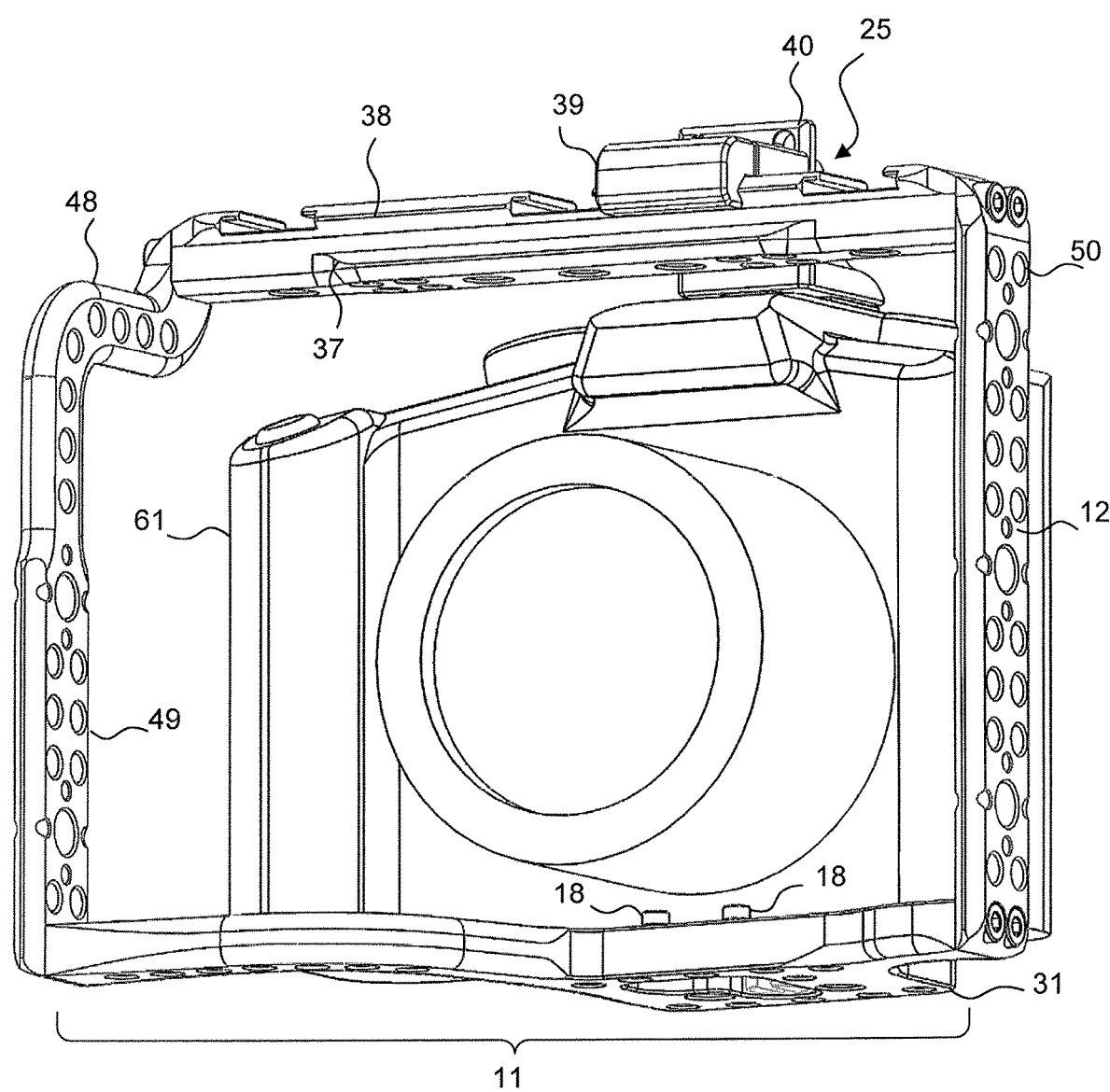

In addition, some cameras have an unusually long distance between the bottom of the camera and the flash shoe of the camera. To accommodate such cameras the shoe-mount-lock 25 can be detached from the rail 37 and re-attached to the rail 38 in a different orientation that is suitable for attachment to a higher-positioned flash shoe (such as through reversible assembly or alternate configuration of one or more portions of the slide 39 that attaches to the rails 37, 38, though other ways to detach and re-attach the slide shoe-mount-lock 25 are possible). FIGS. 11 and 12 are diagrams showing the cage 10 attached to a camera, with the shoe-mount-lock 25 of FIG. 1 being in an elevated position. Whereas with reference to FIG. 1, a portion of the slide 39 is located below the top plate 15 when attached to the rail 37, in the different orientation shown with reference to FIG. 11, a portion of the slide 39 is located above the top plate 15 when attached to the rail 38, thus lifting the overall position of the shoe-mount-lock 25.

Further, whereas flipping the orientation of the slide 39 without adjusting other components of the shoe-mount-lock 25 would leave the shoe-mount top 43 and the shoe-mount foot 27 in an incorrect orientation to couple with a camera flash shoe, the hot-shoe-mount 25 can be disassembled and reassembled to allow for the correct orientation. Thus, the bolts 28 securing the plate 40 to the slide 39 can be entirely removed, allowing the plate 40 (and consequently the shoe-mount-top 43 and the shoe-mount foot 27) to be flipped. Following the flip, the plate 40 is once again secured to the plate 40 to the slide 39, and placing the shoe-mount-top 43 and the shoe-mount-foot 27 in the proper orientation to couple with the flash shoe of the camera. Thus, in addition to being adjustable in three directions, the distance of the shoe-mount-lock from the base 31 can further be increased by changing the positioning and orientation of the slide 39, allowing extra flexibility in accommodating different camera designs. Further, the higher position allows the use of a quick release receiver to be used between the camera and the base of the cage 10. Returning to the top plate 15, while one end of the top plate 15 is attached to the first side plate 12, another end of the top plate 15 is attached to a connector 47, which connects the top plate 15 to the base plate 11. The connector 47 includes a curved portion 48 that connects the top plate 15 to a second side plate 49, with the second side plate 49 being attached to the second protrusion 33 of the baseplate 11. As can be seen with reference to FIG. 1, the curved portion 48 can be substantially S-shaped, though other shapes of the curved portion 48 are possible. In one embodiment, the curved portion 48 and the second side plate 49 are integral to each other, forming one continuous part. In a further embodiment, the curved portion 48 and the second plate 49 are attached to each other, such as via a bolt. Similarly, other connections between the baseplate 11, the first side plate 12, the top plate 15, and the connector 47 can be either integrally connected, forming a continuous cage, or can be removably attached to each other, such as via bolts and screws.

Figure 13:
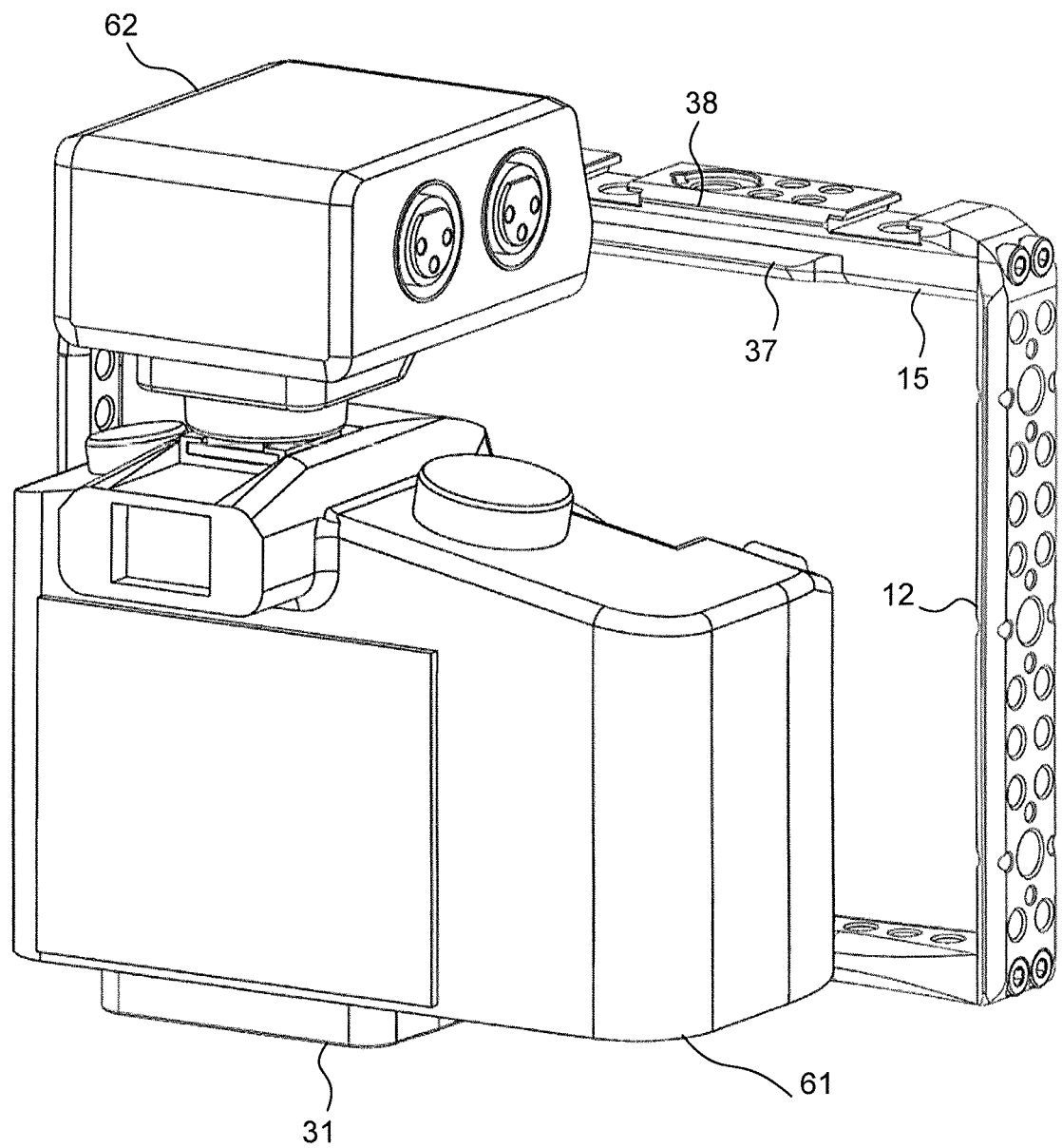
FIGS. 13 and 14 are diagrams showing the cage attached to a camera in the configuration where the second side plate is attached to the first protrusion and the first side plate is attached to the second protrusion.
Figure 14:
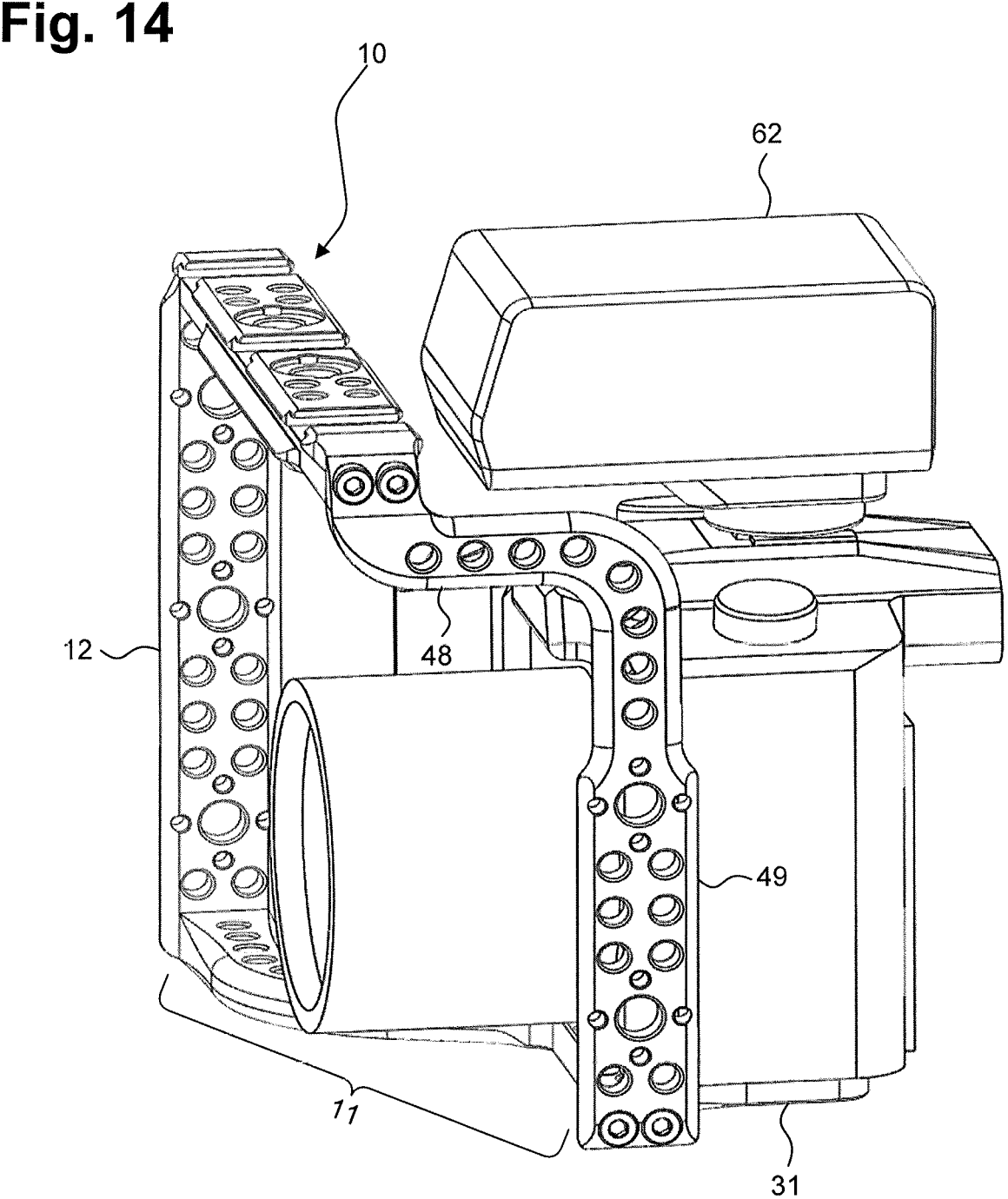

As mentioned above, the ends of the first protrusion 32 and the second protrusion 33 that are most distant from the base 31 are offset from each other with respect to each other in the plane referred in FIG. 1 as the z-plane. As the first side plate 12 is connected to the first protrusion 32 of the baseplate 11 and the second site plate 49 is connected to the second protrusion 33, the first side plate 12 and the second side plate 49 are not directly across from each other, but are offset from each other in the z-axis (as shown with reference to FIG. 1), with the connection of the second side plate 49 to the top plate 15 being made possible by the curve in the curved portion 48. The offset allows for a convenient positioning of a videographer's hand on the cage and an easy access to a camera that is inserted into the cage 10. To allow extra space for accessories on the camera that attach to the camera's flash shoe, such as XLR audio adapters 62 (shown with reference to FIGS. 13 and 14) that connect to the camera electronically through the flash shoe, in one embodiment, the side of the cage 10 that is more distal from the camera operator can be changed by attaching the second side plate 49 to the first protrusion 32 of the baseplate 11 and attaching the first side plate 12 to the second protrusion 33 of the baseplate 11. FIGS. 13 and 14 are diagrams showing the cage 10 attached to a camera 61 in the configuration where the second side plate 49 is attached to the first protrusion 32 and the first side plate 12 is attached to the second protrusion 33. In this embodiment, the first side plate 12 and the second side plate 49 are removably attached to the baseplate 11, such as via bolts and screws, allowing for an easy change of the orientation of the cage. In this configuration, the slide 39 and components of the shoe-mount-lock 25 attached to the slide 39 can be removed from the top plate 15 (with the camera 61 being secured to the cage 10 only at the base 11), as seen with reference to FIGS. 13 and 14, though in a further embodiment, the shoe-lock mount 25 can remain on the top plate 15.

Figure 7:
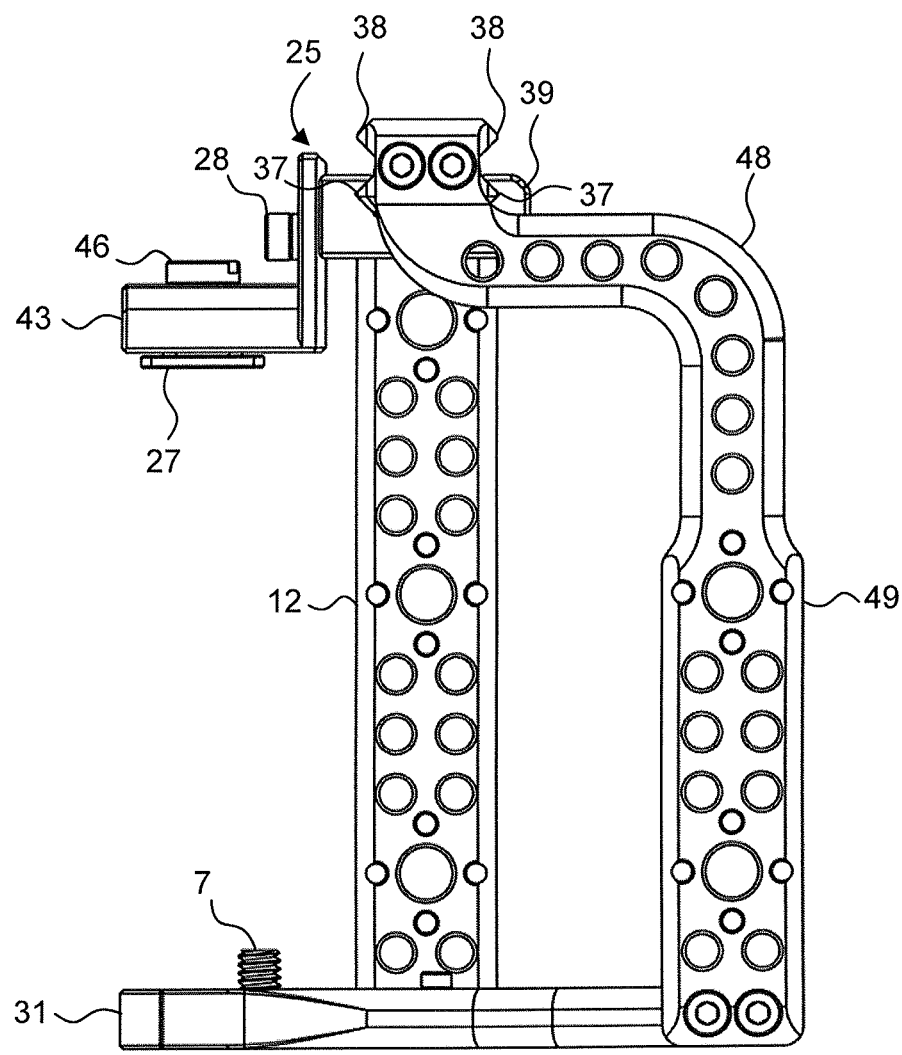
FIGS. 7 and 8 show side views of the cage of FIG. 1.
Figure 8:
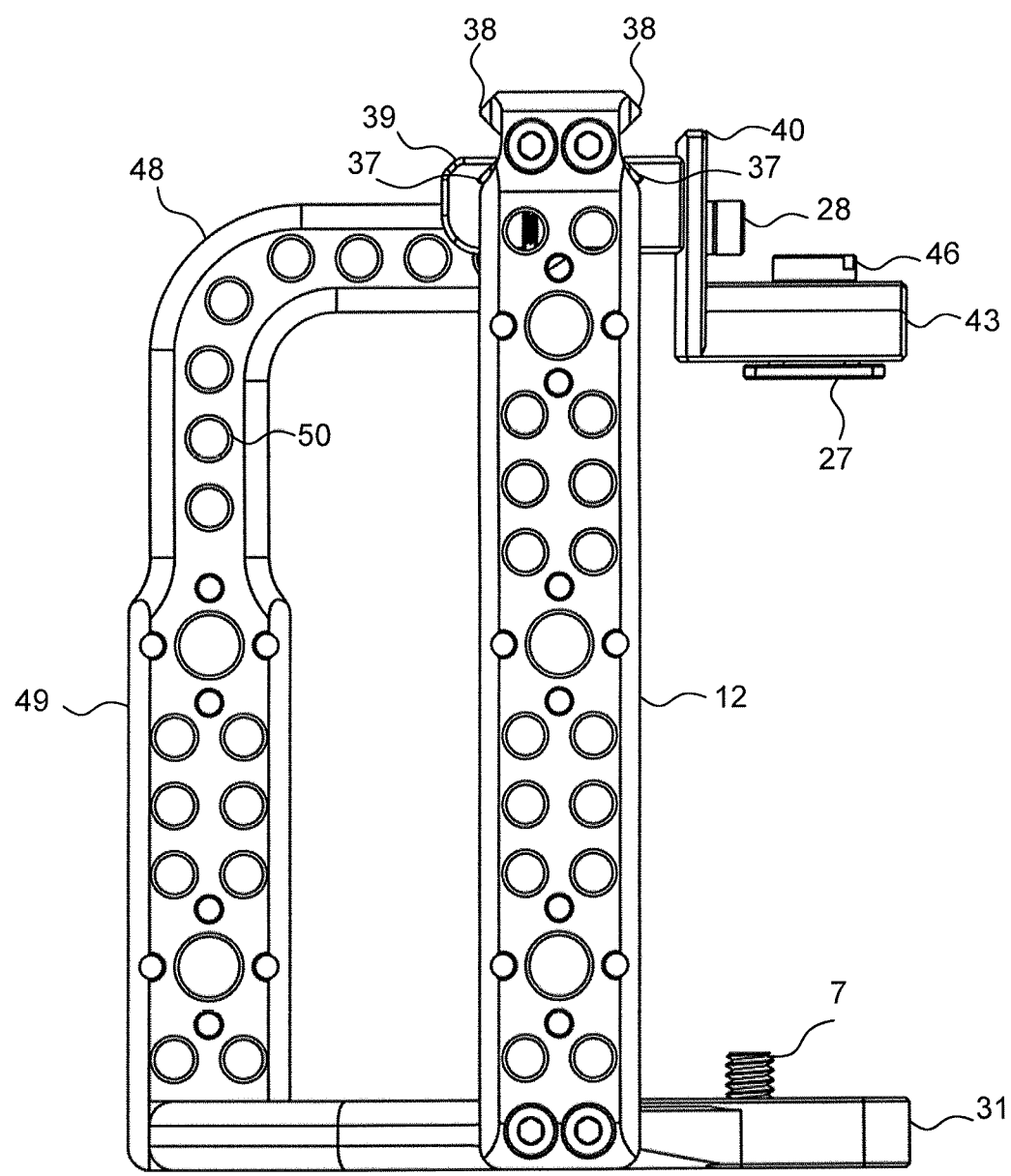

FIGS. 7 and 8 show side views of the cage 10 of FIG. 1. As can be seen with reference to FIGS. 6 and 7, as well as FIGS. 1-3 and 5-6, the cage 10 includes a plurality of holes 50 of various diameter that could be used for attachment for accessories. Such holes 50 reduce the amount of material, such as metal, necessary to make the cage 10, making the cage 10 lighter and easier to handle.

While the invention has been particularly shown and described as referenced to the embodiments thereof, those skilled in the art will understand that the foregoing and other changes in form and detail may be made therein without departing from the spirit and scope.

What is claimed is:

1. A camera cage, comprising:
    a baseplate comprising a base on which one or more contact points for a camera can be formed, the baseplate further comprising a first protrusion formed on one side of the base and a second protrusion formed on an another side of the base;
    a first side plate attached to the first baseplate protrusion;
    a top plate comprising a first end fixedly attached to the first side plate and a second end attached to a connector, the top plate further comprising one or more mounts for one or more external camera accessories;
    the connector comprising a connecting portion and a second side plate, the connecting portion connecting the top plate second end to a first end of the second side plate, a second end of the second side plate attached to the second baseplate protrusion, the second side plate being substantially parallel to the first side plate and not directly opposite the first side plate;
    a further mount for the camera attached to the top plate;
    two accessory rails formed on the top plate, each of the accessory rails formed on two opposite sides of the top plate; and
    a shoe-mount-lock for the camera, comprising:
        a slide, portions of which are securely located within one of the two rails, the slide linearly movable along a length of the rail to which the slide is attached;
        an additional plate removably attached to the slide; and
        a camera shoe attachment point to which the camera can be attached and which is attached to the additional plate.

2. A camera cage according to claim 1, further comprising:
    the additional plate comprising two elongated slots;
    a bolt releasably inserted through each of the slots into the slide, wherein a tightening of the bolts secures the additional plate against the slide and a loosening of the bolts allows a motion of the additional plate in relation to the slide along an axis substantially perpendicular to an axis of the movement of the slide along the rails, and wherein a position of the bolts within the slots changes during the motion.

3. A camera cage according to claim 2, the camera shoe attachment point further
    comprising a pyramidal structure and flat support structure between which a portion of the camera can be secured, further comprising:
    the pyramidal structure comprising an elongated slot at a top surface and a rectangular indentation at a center of the pyramidal structure, wherein the top surface elongated slot and the indentation form a void within the pyramidal structure;
    the flat support structure, wherein the flat support structure is shorter than the pyramidal structure; and
    a further bolt inserted through the top surface elongated slot, securedly connected to the flat support structure, and moveable along a length of the top surface elongated slot, wherein a movement of the further bolt along the length of the top surface elongated slot moves the flat support structure in relation to the pyramidal structure along an axis perpendicular to the axis of the motion of the additional plate and different from the axis of the sliding of the slide along the rails.

4. A camera cage according to claim 1, wherein one or more of additional external camera accessories are mountable unto one or more of the accessory rails.

5. A camera cage according to claim 1, wherein the connecting portion is substantially S-shaped.

6. A camera cage according to claim 1, wherein the second baseplate protrusion is curved with fillet edges.

7. A camera cage according to claim 1, wherein the one or more mounts for the external camera accessories comprise one or more cold shoe mounts.

8. A camera cage according to claim 1, one or more of the connector and the first side plate comprise one or more apertures into which one or more additional external camera accessories can be mounted.

9. A camera cage according to claim 1, wherein the first side plate is removably attached to the first baseplate protrusion and the second side plate is removably attached to the second baseplate protrusion, and the first side plate can be attached to the second baseplate protrusion and the second side plate can be attached to the first baseplate protrusion.

10. A camera cage according to claim 1, further comprising:
    an aperture formed in the base of the baseplate;

a non-undercut screw inserted through the aperture and that retains major diameter above threads and on which the camera can be mounted.

11. A camera cage according to claim 10, further comprising:
three or more additional apertures formed in the base of the baseplate;
two additional screws, each insertable into one of the additional apertures, against which the camera can be butted when the screws are inserted into the two of the additional apertures, wherein the butting of the camera onto the additional screws prevents a rotation of the camera.

12. A camera cage according to claim 10, further comprising:
a further aperture formed in the base of the baseplate through which the non-undercut screw can be inserted.

13. An adjustable camera cage, comprising:
a baseplate comprising a base on which one or more contact points for a camera can be positioned formed, the baseplate further comprising a first protrusion formed on one side of the base and a second protrusion formed on an another side of the base;
a first side plate attached to the first baseplate protrusion;
a top plate comprising a first end fixedly attached to the first side plate and a second end attached to a connector, the top plate further comprising one or more mounts for one or more external camera accessories;
the connector comprising a connecting portion and a second side plate, the connecting portion connecting the top plate second end to a first end of the second side plate, a second end of the second side plate attached to the second baseplate protrusion, the second side plate being substantially parallel to the first side plate and not directly opposite the first side plate;
two parallel accessory rails, each of the accessory rails formed on two opposite sides of the top plate; and
a shoe-mount-lock to which the camera can be attached, the shoe-mount-lock secured to one of the two accessory rails formed on the top plate, wherein a position of at least a portion of the shoe-mount-lock relative to the top plate can be changed in at least three axis, the shoe-mount-lock further comprising:
a slide portions of which are securely located within one of the two rails, the slide linearly movable along a length of the rail to which the slide is attached; and
an additional plate removably attached to the slide and fixedly attached to a camera shoe attachment point.

14. A camera cage according to claim 13, further comprising:
an additional plate comprising two elongated slots and fixedly attached to the shoe-mount-lock;
a bolt releasably inserted through each of the slots into the slide, wherein a tightening of the bolts secures the additional plate against the slide and a loosening of the bolts allows a motion of the additional plate in relation to the slide along an axis substantially perpendicular to an axis of the movement of the slide along the rails, and wherein a position of the bolts within the slots changes during the motion.

15. A camera cage according to claim 14, the camera shoe attachment point further comprising a pyramidal structure and shoe mount foot between which a portion of the camera can be secured, further comprising:
the pyramidal structure comprising an elongated slot at a top surface and a rectangular indentation at a center of the pyramidal structure, wherein the top surface elongated slot and the indentation form a void within the pyramidal structure wherein the shoe mount foot is shorter than the pyramidal structure; and
a further bolt inserted through the top surface elongated slot, securely attached to the shoe foot mount, and moveable along a length of the top surface elongated slot, wherein a movement of the further bolt along the length of the top surface elongated slot moves the shoe mount foot in relation to the pyramidal structure along an axis perpendicular to the axis of the motion of the additional plate and different from the axis of the sliding of the slide along the rails.

16. A camera cage according to claim 13, wherein one or more of additional external camera accessories are mountable unto one or more of the accessory rails.

17. A camera cage according to claim 13, wherein the connector is substantially S-shaped.

18. A camera cage according to claim 13, wherein the second baseplate protrusion is curved with fillet edges.

* * * * *